(12) United States Patent
Gan et al.

(10) Patent No.: US 7,865,487 B2
(45) Date of Patent: Jan. 4, 2011

(54) SYSTEM AND METHOD FOR PROVIDING REMOTE ACCESS TO EVENTS FROM A DATABASE ACCESS SYSTEM

(75) Inventors: Zhen-Qi Gan, Carrollton, TX (US); Derek C. Cress, Dallas, TX (US); Max W. Northrup, Dallas, TX (US)

(73) Assignee: Raytheon Company, Waltham, MA (US)

( * ) Notice: Subject to any disclaimer, the term of this patent is extended or adjusted under 35 U.S.C. 154(b) by 574 days.

(21) Appl. No.: 11/672,460

(22) Filed: Feb. 7, 2007

(65) Prior Publication Data

US 2008/0016146 A1 Jan. 17, 2008

Related U.S. Application Data

(60) Provisional application No. 60/831,036, filed on Jul. 14, 2006.

(51) Int. Cl.
*G06F 17/30* (2006.01)
(52) U.S. Cl. .............................. 707/705; 326/8; 709/203
(58) Field of Classification Search .................... 707/10, 707/705; 326/8; 709/203
See application file for complete search history.

(56) References Cited

U.S. PATENT DOCUMENTS

| | | | | |
|---|---|---|---|---|
| 4,797,911 A * | 1/1989 | Szlam et al. | ............. | 379/88.22 |
| 5,787,411 A * | 7/1998 | Groff et al. | ..................... | 707/2 |
| 6,950,988 B1 * | 9/2005 | Hawkins et al. | ............. | 715/700 |
| 7,328,028 B2 * | 2/2008 | Carlson et al. | ........... | 455/456.1 |
| 7,469,248 B2 * | 12/2008 | Agrawal et al. | ................ | 707/10 |
| 7,523,118 B2 * | 4/2009 | Friedlander et al. | ......... | 707/100 |
| 2001/0034771 A1 * | 10/2001 | Hutsch et al. | ................ | 709/217 |
| 2003/0172145 A1 * | 9/2003 | Nguyen | ...................... | 709/223 |
| 2004/0002958 A1 * | 1/2004 | Seshadri et al. | ................. | 707/3 |
| 2005/0131778 A1 * | 6/2005 | Bennett et al. | ................. | 705/29 |
| 2006/0167850 A1 * | 7/2006 | Fish et al. | ....................... | 707/3 |
| 2007/0294114 A1 * | 12/2007 | Urali et al. | ...................... | 705/3 |

OTHER PUBLICATIONS

U.S. Appl. No. 11/773,260, entitled "Geographical Information Display System and Method," (46 pages) Jul. 3, 2007.
PCT International Search Report and Written Opinion (ISA/EP) for PCT/US2007/073207; 13 pages, Dec. 13, 2007.
Novell: DirXML Documentation, Internet Citation, DIRXML documentation[online], http://www.novell.com/documentation/dirsm110/pdfdoc/dirxml/dirxml.pdf, pp. 9-15, Nov. 2000.

* cited by examiner

*Primary Examiner*—John R. Cottingham
*Assistant Examiner*—Noosha Arjomandi
(74) *Attorney, Agent, or Firm*—Baker Botts L.L.P.

(57) ABSTRACT

In one embodiment, a database access system includes a remote client application, a database having a plurality of data records, and a data event agent. The database has a plurality of data records and is coupled to the data event agent. The data event agent is remotely coupled to the remote client application through a firewall and operable to receive a query from the remote client application. In response to receipt of the query, the data event agent stores the query in memory in order to continually filter additions and modifications to data records against the one or more filter criteria included in the query. In the event that a data record matches the query, the data event agent transmits the data record to the remote client application.

11 Claims, 5 Drawing Sheets

FIG. 3

SYSTEM AND METHOD FOR PROVIDING REMOTE ACCESS TO EVENTS FROM A DATABASE ACCESS SYSTEM

CROSS-REFERENCE TO RELATED APPLICATIONS

This application claims the benefit of priority under 35 U.S.C. §119(e) of U.S. Provisional Application Ser. No. 60/831,036, filed Jul. 14, 2006, and entitled "INTEGRATION BACKBONE."

TECHNICAL FIELD OF THE DISCLOSURE

This disclosure generally relates to computing systems, and more particularly, to a system for providing remote access to events and a method of implementing the same.

BACKGROUND OF THE DISCLOSURE

The advent of modern day computing systems has required the storage of large amounts of data. To supply this need, varying types of databases have been implemented that store large amounts of data in an organized manner. Conventional implementations of databases have provided for the storage of individual instances of data as a data record. Thus, information in a database may be provided by individual data records that may be delineated according to one or more criteria.

SUMMARY OF THE DISCLOSURE

In one embodiment, a database access system includes a remote client application, a database having a plurality of data records, and a data event agent. The database has a plurality of data records and is coupled to the data event agent. The data event agent is remotely coupled to the remote client application through a firewall and operable to receive a query from the remote client application. In response to receipt of the query, the data event agent stores the query in memory in order to continually filter additions and modifications to data records against the one or more filter criteria included in the query. In the event that a data record matches the query, the data event agent transmits the data record to the remote client application.

In another embodiment, a method includes generating a query by a remote client application, transmitting the query to a database access system through a firewall, filtering additions or modifications to a plurality of data records, and in the event that a particular one of the plurality of data records matches the query, transmitting the data record to the remote client application through the firewall. The query may include at least one type of filter criteria that may be matched with an associated criteria in each of the data records.

Embodiments of the disclosure may provide numerous technical advantages. Some, none, or all embodiments may benefit from the below described advantages. According to one embodiment, a system and method are provided for remote access to additions or modifications of individual data records in a database that may occur sometime in the future. The database may be accessible only from across a firewall such that access to data records in the database are not readily accessible to users outside of the firewall. Thus, certain embodiments may provide a database access system that is capable of continually monitoring for additions or modifications of data records in database and transmitting these data records to a remotely coupled client application in the event that one or more particular data records are identified by the system.

Other technical advantages will be apparent to one of skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Embodiments of the disclosure are best understood by referring to FIGS. 1 through 6 of the drawings, like numerals being used for like and corresponding parts of the various drawings.

Figure 1:
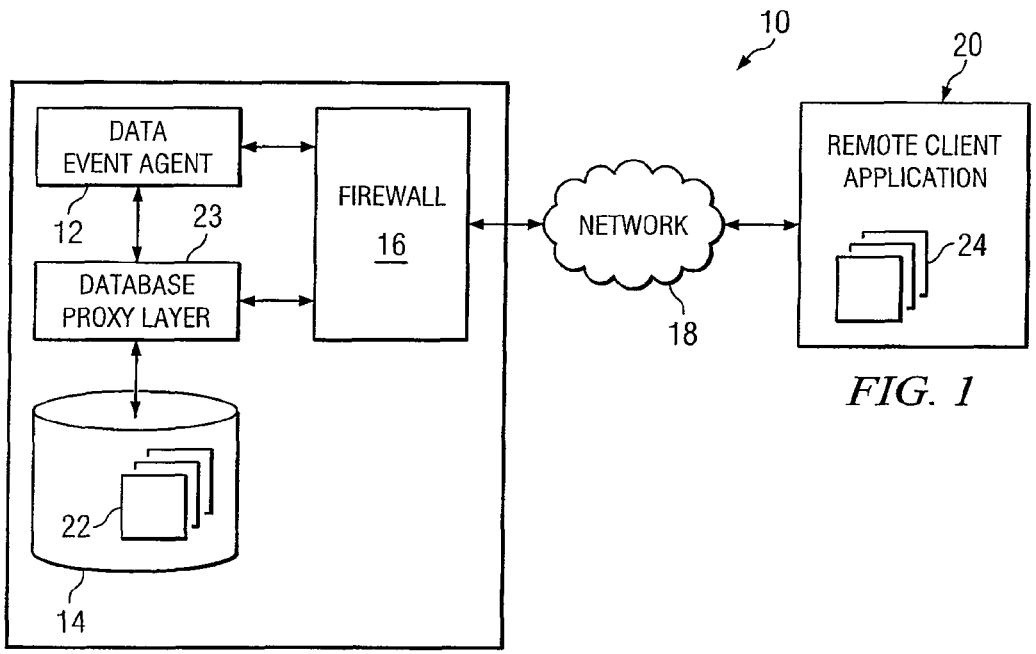
FIG. 1 is a block diagram showing several components of a database access system according to the teachings of the present disclosure.

FIG. 1 is a block diagram illustrating one embodiment of a database access system 10. Database access system 10 generally includes a data event agent 12 that is coupled to a database 14 and one or more remote client applications 20 through a network 18. In order to regulate access to database 14, a firewall 16 may be provided. Database access system 10 may enable access by a remote client application 20 to one or more data records 22 in database 14. Remote client application 20 may be configured to issue one or more queries 24 to database 14, and in response, receive one or more data records 22 from database 14 in response to those queries 24.

In one embodiment, data event agent 12 may be coupled to database 14 through a database proxy layer 23. The database proxy layer 23 may be operable to broker requests from the remote client application 20 to database 14. In another embodiment, the database proxy layer 23 may broker requests from the remote client application 20 to database 14 by encapsulating one or more of the data records 22 into a standardized format that is accessible by the remote client application 20.

According to the teachings of the disclosure, remote client application 20 may be operable to issue queries 24 for data records 22 that may be added or modified sometime in the future using data event agent 12. The data event agent 12 is operable to store queries 24 that may be generated by remote client application 20 and continually monitor database 14 for modifications or additions of data records 22 that may match filter criteria included in the query. In the event that a particular data record 22 matches the query 24, the data record 22 may be transmitted to the remote client application 20.

A particular data record 22 that may be added or modified sometime in the future may represent a future event. An event may be any activity that may occur at a particular point in time. If the event is stored as a data record 22 in the database 14, the data record 22 may include information regarding the nature of the activity or event. Examples of events that may be represented by data records 22 may include weather related information, emergency events, general human interest news, or the like. In one embodiment, data records 22 may represent events that are of interest to military personnel such as enemy activity, enemy movement, or other intelligence, surveillance, and reconnaissance (ISR) activities. Thus, certain embodiments may allow receipt of future events represented by additions or modifications of data records 22 to a remote client application 20.

Remote client application 20 may be any software application that is executable on a computer system and is capable of issuing requests for data and displaying responses to those requests for a user. In one embodiment, remote client application 20 may be a conventional web browser, such as, for example, one version of a firefox, opera, or internet explorer web browser. Remote client application 20 may communicate with data event agent 12 and/or database proxy layer 23 using any suitable network protocol. In one embodiment, remote client application 20 may function as a client and data event agent 12 and database 14 may function as a server using a client/server type model. Using this model, remote client application 20 may request files or other data such as data records 22 from database 14 and in response, the data event agent 12 or database 14 may send one or more files or data to the remote client application 20 in response to those requests. In one embodiment, network 18 may be a local area network (LAN), such as an intranet. In another embodiment, network 18 may be a wide area network (WAN), such as the Internet.

Figure 2:
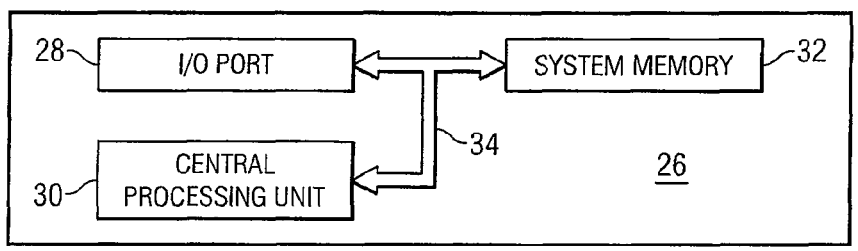
FIG. 2 is a block diagram of an example computing system that may be used to store and execute a data event agent of the embodiment of FIG. 1.

FIG. 2 shows an example computing system 26 on which the data event agent 12 may be operable to perform the various embodiments of the present disclosure. Computing system 26 may include an input/output port 28, a central processing unit 30, and a memory 32 that are coupled together by a system bus 34. Input/output port 28 may be operable to logically couple computing system 26 to network 18. In one embodiment, input/output port 28 may be configured to communicate with network 18 using any suitable protocol, such as an Ethernet or token ring type transmission protocol.

Central processing unit 30 is operable to execute the various features and embodiments of the data event agent 12. The features and embodiments of data event agent 12 may be stored in memory 32 as a sequence of executable instructions using any suitable programming language. Memory 32 may also be operable to store various forms of data, which may be, for example, information for a user or other forms of data used by the data event agent 12. Memory 32 may include any volatile or non-volatile memory device, such as read-only memory (ROM), random access memory (RAM), or a fixed storage such as an optical or magnetic bulk data storage medium. In this particular embodiment, the central processing unit 30 may be a conventional microprocessor circuit chip. In general, computing system 26 may be any computing device, which may include a personal computer, laptop computer, work station, or an enterprise computing system.

Figure 3:
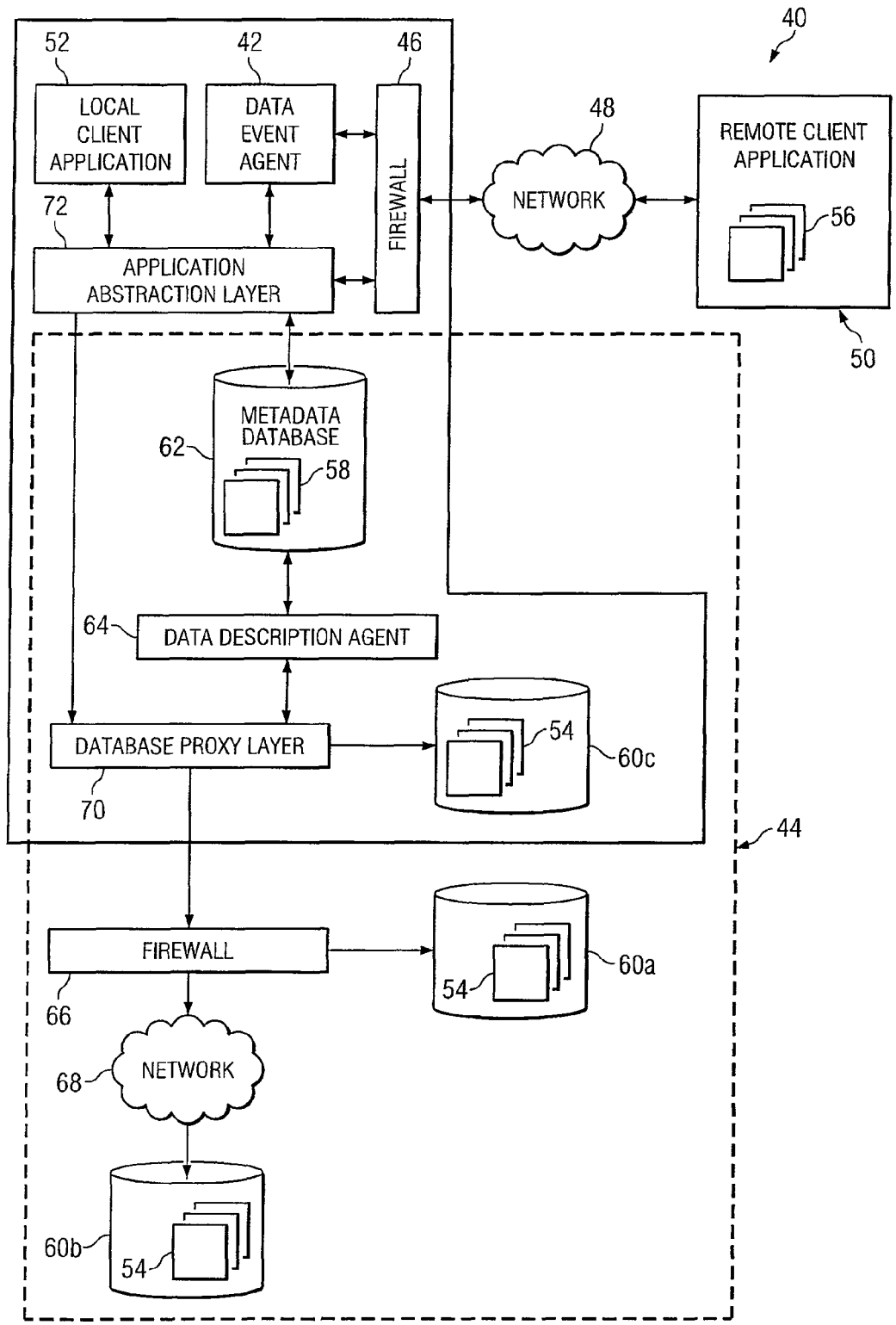
FIG. 3 is a block diagram showing several components of another embodiment of a database access system according to the teachings of the present disclosure.

FIG. 3 shows another embodiment of a database access system 40 that incorporates a distributed database 44. Database access system 40 may be configured for use within an enterprise, such as a corporate or governmental organization. Database access system 40 may include a data event agent 42, network 48, firewall 46, and remote client application 50 that are similar in function and purpose to data event agent 12, network 18, firewall 16, and remote client application 20 of the embodiment of FIG. 1. Data event agent 12 may also be stored and executed on example computing system 26 that may be configured in database access system 40.

Database access system 40 also has a distributed database 44 that is operable to serve data records 54 in response to queries 56 from remote client application 50. Local client application 52 may also be provided in order to provide access to data records 54 of distributed database 44 within the domain of the database access system 40. In one embodiment, firewall 46 may be an enterprise firewall. An enterprise firewall may refer to any type of firewall that is operable to provide limited access to files or resources of network enabled computing equipment within a domain of an enterprise. Thus, the database access system 40 may provide for access and filtering of additions or modifications of data records 54 in distributed database 44 to remote client application 50 that is coupled across a firewall 46.

Distributed database 44 may provide access to data records 54 that are stored in one or more federated databases 60. Distributed database 44 also has a metadata database 62 that is configured to store metadata records 58. Each metadata record 58 may be associated with a corresponding data record 54 stored in one of the federated databases 60. A metadata record 58 may be referred to as a type of data record that includes abbreviated information relative to its corresponding data record 54. Distributed database 44 may also have a data discovery agent 64 that enables periodic searching for additions or modifications of data records 54 in federated databases 60. Thus, distributed database 44 may enable access to data records 54 in several federated databases 60 that are searchable and filterable using metadata records 58.

In one embodiment, data discovery agent 64 may be operable to periodically search through one or more federated databases 60 for data records 54. When found, data discovery agent 64 may create an abbreviated metadata record 58 and subsequently store this metadata record 58 in metadata database 62 for use by database access system 40. A particular metadata record 58 may include information pertaining to any alpha-numeric, time, or geographical related information in order to enable filtering of the metadata record 58 based upon its contextual, temporal, or geo-spatial related criteria respectively as described above.

A federated database 60 may exist within the enterprise or may be external to the enterprise. For example, federated database 60a may be external to database access system 40 in that coupling thereto may require regulation of access using a firewall 66. In one embodiment, firewall 66 is integrally configured with firewall 46. Federated database 60b may be coupled to database access system 40 through firewall 66 as well as through a network 68, such as an intranet, or the Internet. Federated database 60c may be within the domain of the enterprise such that coupling through firewall 66 may not be necessary. Thus, the database access system 40 may incorporate a distributed database 44 that has access to many forms of data records 54 across internal as well as external domains.

Distributed database 44 may include any federated database 60 whose data records 54 are accessible by the database access system 40. In one embodiment, a database proxy layer 70 may be provided to provide an uniform interface to each of the federated databases 60. Because federated databases 60 outside of the database access system 44 may not be maintained by the enterprise, data records 54 in these federated databases 60 may not exist in a format that is readily usable by the database access system 40. Therefore, database proxy layer 70 serves to provide a uniform interface for access to data records 54 as well as to present each data record in a standardized format. In one embodiment, database proxy layer 70 may be operable to encapsulate each data record 54 that may be accessed from federated databases 60 according to an extensible markup language (XML) schema. The XML language is a general purpose markup language that enables formatting of disparate types of data into a common format. According to this particular embodiment, usage of XML schema allows formatting of data records 54 having disparate formats into an uniform format that is readily usable by the database access system 40.

As described above, database access system 40 may have a firewall 46 to regulate access to data records 54 stored in distributed database 44. However, data records 54 that have been encapsulated in XML format are not adapted to easily pass through firewall 46. Thus in one embodiment, data event agent 42 may be configured to further encapsulate each data record 54 that is transmitted to remote client application 50 according to a simple object access protocol (SOAP) schema. Simple object access protocol is a type of protocol that provides for the transmission of XML formatted messages across a network and provides an encoding scheme that allows selective validation by firewall 46.

Database access system 40 may also include an application abstraction layer 72 that may provide for the seamless communication of data event agent 42 with remote client application 50, local client application 52, and distributed database 44. That is, application abstraction layer 72 may control the flow of messages between the remote client application 50, data event agent 42, local client application 52, and distributed database 44 in an efficient, organized manner. In one embodiment, application abstraction layer 72 may be implemented using a java messaging service (JMS). Java messaging service is a type of message oriented middleware (MOM) that enables the asynchronous transmission of messages between clients. Thus in this particular embodiment, implementation of application abstraction layer 72 using a java messaging service, allows receipt and transmission of a large number of messages among the data event agent 42, remote client application 50, local client application 52, and distributed database 44 in a relatively efficient manner.

Figure 4:
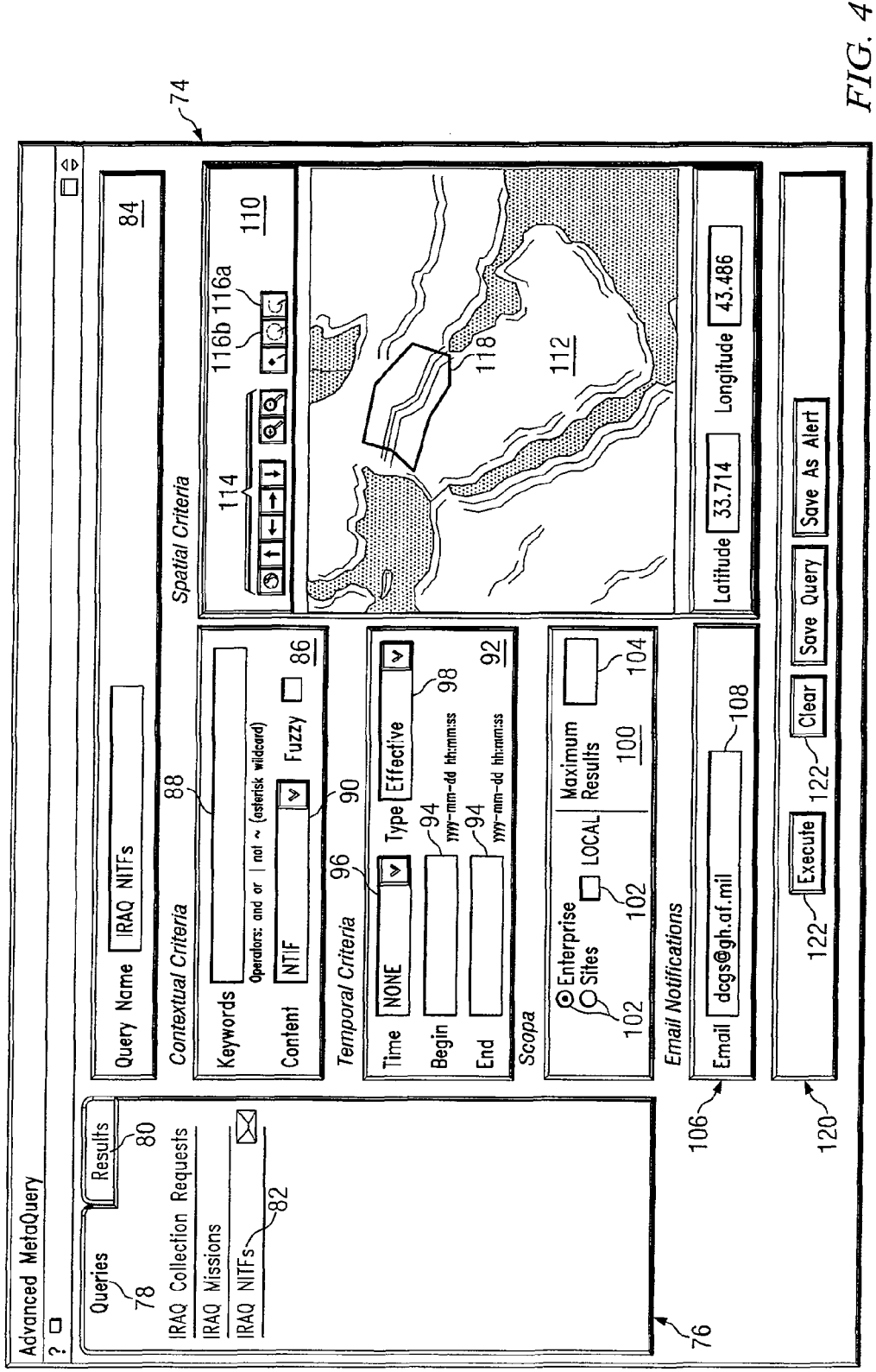
FIG. 4 is an example screen shot of one embodiment of a window that may be used to generate a query on the remote client application of the embodiments of FIG. 1 or 3.

FIG. 4 is a screen shot showing one embodiment of an example window 74 that may be displayed by remote client application 20 or 50. As shown, the example window is implemented on an internet explorer web browser; however, remote client application 20 or 50 may be any client application, such as a firefox, seamonkey, or opera type web browser. Window 74 may have a number of sub-window portions that enable the user to interface with database access system 10 or 40. In this particular embodiment, window 74 has a query/results portion 76 that includes a 'Queries' tab 78 and a 'Results' tab 80. FIG. 4 shows window 74 that results due to selection of 'Queries' tab 78. A description of the window shown as a result of selecting the 'Results' tab 80 will continue with respect to FIG. 5 below.

FIG. 4 shows a window 74 that may be displayed in response to selection of the 'Queries' tab 78. In addition to query/results portion 76, other sub-window portions may include a query name portion 84, a contextual criteria portion 86, a temporal criteria portion 92, a scope portion 100, a e-mail notification portion 106, a spatial criteria portion 110, and a menu bar portion 120.

'Query/results' portion 76 may be provided to enable user access to storage of queries as well as user access to storage of the results of these queries. 'Query/results' portion 76 may display a list of saved queries 82. In this particular screen shot, the 'Queries' tab 78 has been selected and thus a list of stored queries 82 are displayed in the query/results portion 76. In this manner, the user may be able to construct queries using varying types of filter criteria and save these queries for use at a later time. Query name portion 84 may be provided to display the actively selected query from the list in query/results portion 76.

Contextual criteria portion 86 may be provided to enable user entry of contextual filtering criteria. Contextual criteria portion 86 may include a keyword field 88 for entry of particular words or phrases that may be of interest to the user. Contextual criteria portion 86 may also enable entry of Boolean operators, such as AND, OR, NOT, type Boolean operators. These Boolean operators may be applied against various combinations of keywords or key-phrases. In this manner, the query may enable relatively specific filtering criteria for varying types of data records 22 or 54. A 'Content' field 90 may be included to enable filtering based upon particular types of content within each metadata record 58.

Temporal criteria portion 92 may be provided to enable user entry of temporal filtering criteria. As described above, each metadata record 58 may include a time field indicating a particular point in time in which the future event represented by the data record 22 or 54 occurred. Thus, by selection of a range of time provided for by 'Begin' or 'End' fields 94, metadata records 58 may be filtered to only return data records 22 or 54 associated with that particular time range. Included in the temporal criteria field 92 is a 'Time' field 96 and a 'Type' field 98. 'Time' field 96 may be used to disable filtering of metadata records 58 against temporal criteria. 'Type' field 98 may be used to filter time based filtering against other time based criteria.

Scope portion 100 may be included to enable searches for data records 22 or 54 included in particular federated databases 60. That is, the user may be able to limit the data record search to all or only a portion of all available federated databases 60. Radio buttons 102 corresponding to 'Enterprise', 'Sites', or 'LOCAL' are provided to enable toggling among the available federated databases 60. A 'maximum results' field 104 is also provided that serves to enable an upper limit of the total quantity of data records 22 or 54 returned to the remote client application 50. It should be appreciated that scope portion 100 may be used if a distributed database 44 according to the embodiment of FIG. 3 is implemented. If a generally homogeneous database 14 according to the embodiment of FIG. 1 is implemented, the features of scope portion 100 may be unused.

E-mail notification portion 106 may also be provided to enable entry of an e-mail address by the user. Entry of a valid e-mail address in 'Email' field 108 will cause the data event agent 12 or 42 to transmit a particular data record 22 or 54 to the entered e-mail address if a data record 22 or 54 representing a future event matches the entered contextual, temporal, or geo-spatial criteria.

Spatial criteria portion 110 may be included to enable user entry of geo-spatially related filter criteria. Spatial criteria portion 110 may include a map portion 112 that enables selection by the user of a particular geographical region using a user interface device such as a mouse. Map navigation buttons 114 may be included to enable navigation over differing portions of the displayed map. Additionally included are several selection mode buttons 116 that enable selection of geographical regions using various geometries. In the particular example shown in FIG. 4, the polygon button 116a has been selected and thus a geographical region 118 in the shape of a polygon may be drawn on the map portion 112. Additionally provided is a point-radius button 116b that allows selection of a geographical region that would be in the shape of a circle. Menu bar portion 120 may be provided with several buttons 122 to enable the user to perform various administrative tasks of the database access system 10 or 40.

The above described window 74 may allow creation of a query 24 or 56 that may be used by the system 10 or 40 for filtering of future events represented by data records 22 or 54. Once created, the query 24 or 56 may be transmitted to data event agent 12 or 42 such that the data event agent 12 or 42 may continually monitor the database 14 or 44 for modifications or additions to data records 22 or 54. Queries for particular data records 22 or 54 may include various filter criteria that specifies the type of data records desired. Thus, data event agent 12 or 42 may be operable to filter future additions or modifications of data records 22 or 54 against various contextual, temporal, and/or geo-spatial aspects of these data records 22 or 54.

Figure 5:
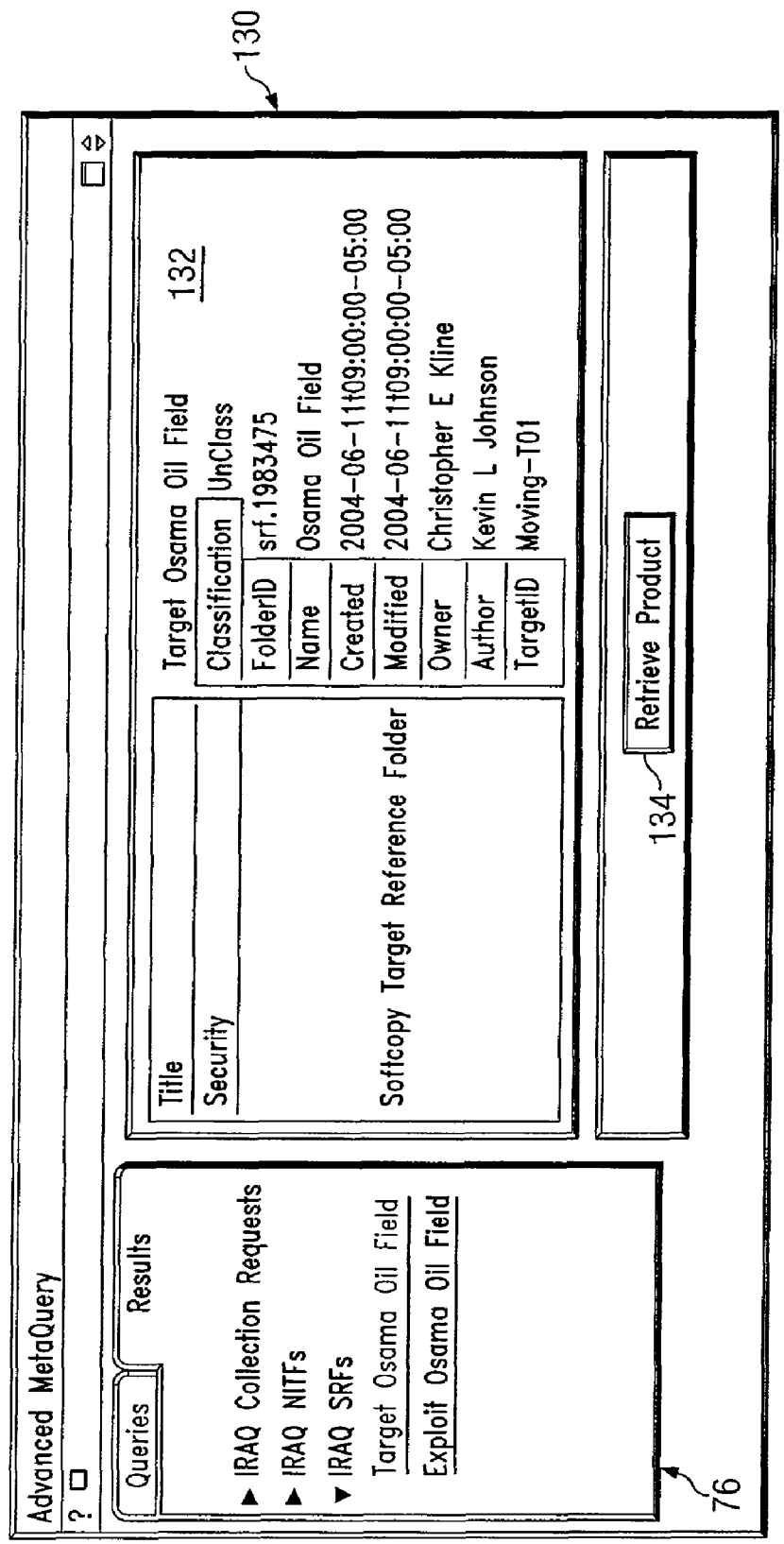
FIG. 5 is an example screen shot of one embodiment of a window that may be used to display the results of a query on the remote client application of the embodiments of FIG. 1 or 3.

FIG. 5 shows a window 130 that may be displayed in response to selection of the 'Results' tab 80. Window 130 may include query/results portion 76 and a metadata record display portion 132. Thus, upon selection of a particular metadata record 58 from the query/results portion 76, metadata information regarding that particular metadata record 58 may be shown in the metadata record display portion 132. Metadata record display portion 132 may also include a 'Retrieve Product' button 134 that allows the user to view the data record 22 or 54 associated with the displayed metadata record 58.

Thus, one example of an user interface has been provided to enable users to effectively enter query criteria for metadata records 58 representing future events and an example of viewing metadata records 58 that match user specified filtering criteria. It should be understood however, that other interfaces may be designed that allows a user to enter and retrieve information from the database access system 10 or 40. Thus, the previously described example should enable the reader to construct one embodiment of a user interface for the database access system 10 without limiting the scope of the present disclosure.

Figure 6:
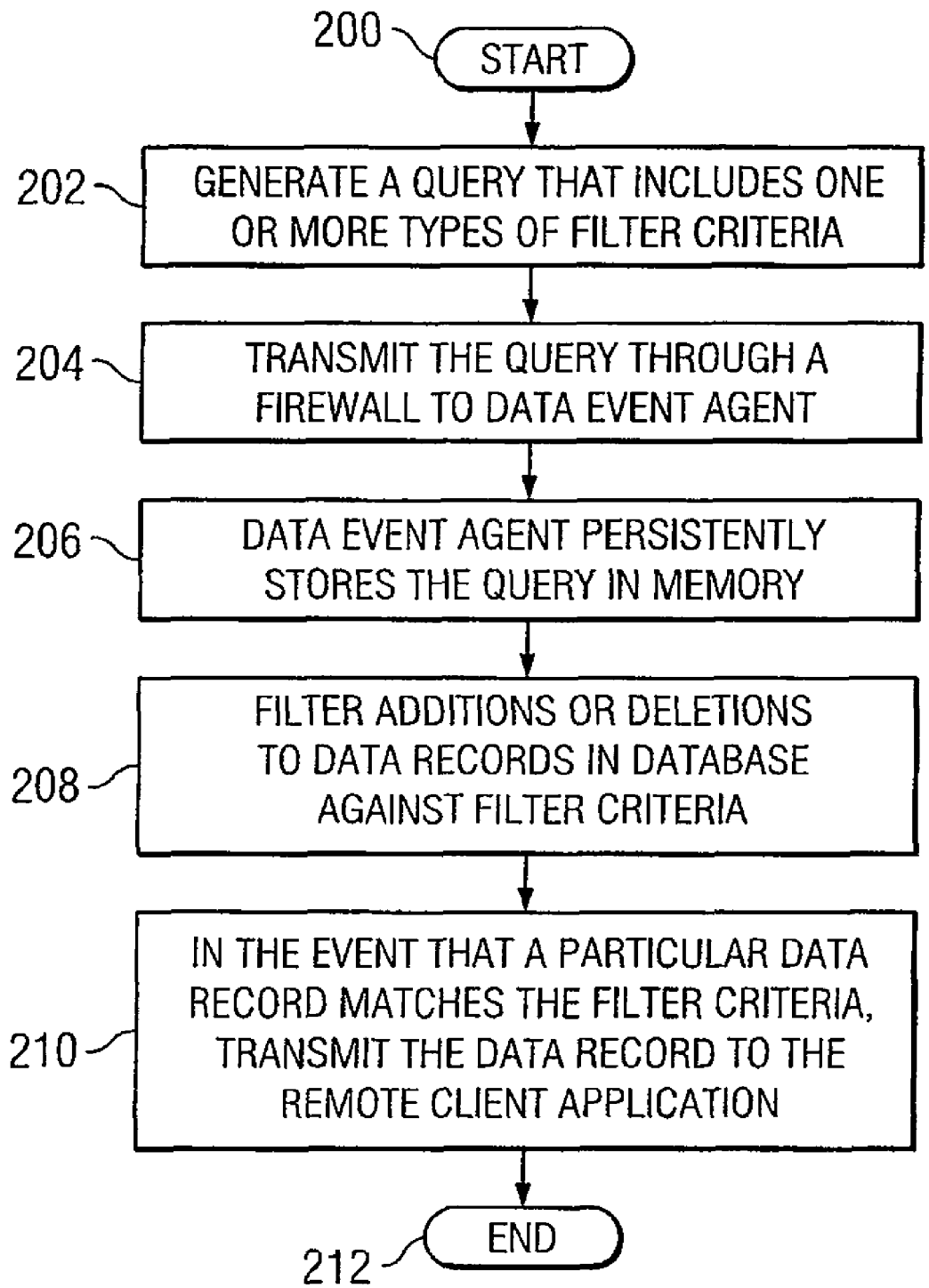
FIG. 6 is a flowchart showing a series of actions that may be taken by the embodiments of FIG. 1 or 3 in order to implement the embodiments of FIG. 1 or 3.

FIG. 6 shows a flowchart depicting a series of actions that may be performed by the database access system 10 or 40. In act 200, the data event agent 12 or 42 is initiated and available to accept queries from one or more remote client applications 20 or 50.

In act 202, a query is generated that includes one or more types of filter criteria. This filter criteria may include contextual, temporal, or geo-spatial related filter criteria. The query may be generated by a remote client application 20 or 50 that is coupled to data event agent 12 or 42 through a firewall 16 or 46. Identification information associated with remote client application 20 or 50 is provided with the query. Thus, when matching data records 22 or 54 are found by data event agent 12 or 42, these matching records may be transmitted to the proper remote client application 20 or 50. Once the query has been generated, it may be transmitted through firewall 16 or 46 to the data event agent 12 or 42 in act 204. In act 206, data event agent 12 or 42 persistently stores the query in memory 32 upon receipt of the query.

At this point, the data event agent 12 or 42 may continually monitor database 14 or 44 for additions or modifications to data records 22 or 54 that may match the filter criteria in act 208. If database 44 is a distributed database, metadata database 62 may be continually monitored for additions or modifications to metadata records 58. In the event that a data record 22 or 54 matches the specified filter criteria, the data record 22 or 54 is transmitted to the remote client application 20 or 50 in act 210. If a distributed database is implemented, the data record 22 or 54 associated with the matched metadata record 58 is retrieved from a pertinent federated database 60. This data record 22 or 54 is then forwarded on to the remote client application 20 or 50. The previously described method continues until the query is deleted by the remote client application 20 or 50 or the database access system 10 or 40 is stopped in act 212.

Although the present disclosure has been described in detail, it should be understood that various changes, substitutions, and alterations can be made hereto without departing from the spirit and scope of the disclosure as defined by the appended claims.

What is claimed is:

1. A database access system comprising:
   a memory;
   a web browser;
   a distributed database comprising:
      a plurality of federated databases for storage of a plurality of data records; and
      a metadata database for storage of a plurality of metadata records, each metadata record representing a corresponding one of the plurality of data records, each metadata record comprising abbreviated information relative to its corresponding one of the plurality of data records; and
   a data event agent that is coupled to the distributed database using an application abstraction layer, the application abstraction layer operable to control the flow of information between the data event agent and the distributed database, the data event agent also being coupled to the web browser through a firewall, the data event agent being operable to:
      receive a query comprising contextual, temporal, or geo-spatial filter criteria from the web browser;
      store the query in the memory;
      repeatedly filter at least one of the plurality of metadata records against the query in response to an addition or modification of the at least one metadata record; and
      in the event that the at least one metadata record matches the query, transmit the corresponding one of the plurality of data records to the web browser;
   wherein the plurality of federated databases are coupled to the data event agent using a database proxy layer;
   wherein the database proxy layer is operable to convert each of the plurality of data records into a standardized format using an extensible markup language schema; and
   wherein the distributed database further comprises a data discovery agent that is operable to periodically search each of the federated databases and in the event that a new data record is found, create a corresponding metadata record.

2. A database access system comprising:
   a memory;
   a remote client application;
   a database for storage of a plurality of data records;
   a data event agent that is coupled to the database using an application abstraction layer, the application abstraction layer operable to control the flow of information between the data event agent and the database, the data event agent also coupled to the remote client application through a firewall, the data event agent being operable to:
      receive a query from the remote client application;
      store the query in the memory;

repeatedly filter one of the plurality of data records against the query in response to an addition or modification of the one data record in the database; and in the event that the one data record matches the query, transmit the one data record to the remote client application; and a data discovery agent operable to periodically search the database and in the event that a new data record is found, create a corresponding metadata record;

wherein each metadata record comprising abbreviated information relative to its corresponding one of the plurality of data records; and a database proxy layer is operable to convert each of the plurality of data records into a standardized format using an extensible markup language schema.

3. The database access system of claim 2, wherein the data record is stored in a distributed database comprising a plurality of federated databases and a metadata database.

4. The database access system of claim 3, wherein the data record comprises a data record portion and a metadata record portion, the data record portion being stored in the federated database and the metadata record portion being stored in the metadata database.

5. The database access system of claim 4, wherein the database proxy layer is operable to encapsulate each of the data record portions into a standardized data record and expose the standardized data record for use by the remote client application.

6. The database access system of claim 5, wherein the database proxy layer is implemented according to an extensible markup language schema.

7. The database access system of claim 2, wherein the application abstraction layer is implemented using a Java messaging service.

8. The database access system of claim 7, wherein application abstraction layer is configured to format the data record according to a simple object access protocol schema.

9. The database access system of claim 7, wherein the query is operable to filter data records according to a filter criteria that is selected from the group consisting of geospatial, contextual, or temporal filter criteria.

10. The database access system of claim 2, wherein the data event agent is coupled to the remote client application through the Internet.

11. The database access system of claim 2, wherein the remote client application is a web browser.

* * * * *